United States Patent [19]

Hirs

[11] 4,197,205
[45] Apr. 8, 1980

[54] DEEP BED FILTER

[76] Inventor: Gene Hirs, 8228 Goldie, Walled Lake, Mich. 48088

[21] Appl. No.: 23,470

[22] Filed: Mar. 23, 1979

Related U.S. Application Data

[63] Continuation-in-part of Ser. No. 801,702, May 31, 1977, abandoned, and a continuation-in-part of Ser. No. 879,296, Feb. 21, 1978, abandoned.

[51] Int. Cl.² .......................................... B01D 23/10
[52] U.S. Cl. .................................. 210/275; 210/290; 210/506
[58] Field of Search ............... 210/80, 82, 83, 84, 210/73, 284, 290, 275, 277, 278, 500 R, 503, 504, 506, 192, 510, DIG. 26; 428/325, 402, 446

[56] References Cited

U.S. PATENT DOCUMENTS

| | | | |
|---|---|---|---|
| 2,145,901 | 2/1939 | Shoemaker | 210/504 |
| 3,104,196 | 9/1963 | Shannon | 428/407 |
| 3,247,294 | 4/1966 | Sabouni | 428/310 |
| 3,276,585 | 10/1966 | Kalinske | 210/82 |
| 3,343,680 | 9/1969 | Rice | 210/263 |
| 3,396,123 | 8/1968 | Urban | 210/504 |
| 3,424,674 | 1/1969 | Webber | 210/80 |
| 3,471,025 | 10/1969 | Dobson | 210/290 |
| 3,544,457 | 12/1970 | Tulley | 210/290 |
| 3,704,786 | 12/1972 | Lerner | 210/504 |
| 3,814,247 | 6/1974 | Hirs | 210/82 |
| 3,876,546 | 4/1975 | Hsiung | 210/290 |
| 3,933,629 | 1/1976 | Smith | 210/17 |
| 3,962,078 | 6/1976 | Hirs | 210/275 |
| 4,010,232 | 3/1977 | Labrecque | 428/310 |
| 4,048,068 | 9/1977 | Hirs | 210/284 |

*Primary Examiner*—Ernest G. Therkorn
*Attorney, Agent, or Firm*—Irons and Sears

[57] ABSTRACT

A filter for filtering contaminants from liquid, wherein the apparatus includes several distinct, adjacent layers of granular filter medium. The layers are carefully graded for size and density, with the granules constituting the layers increasing in density and decreasing in size in the direction of filter flow. At least some of the layers are composed of essentially uniformly sized and shaped, water-wettable synthetic granules of a specific gravity ranging from about 1.04 to about 1.5. For some applications, all of the bed layers are formed of such synthetic granules; for other applications, some of the layers, preferably the lower layers, are formed of naturally occurring materials, such as anthracite, sand, and fruit pit shells or nut shells. In either form of the invention, the distribution of density and size in the direction of flow—normally downwardly—is such that the layers readily stratify after backwashing to reconstitute the bed in its initial, most efficient filtration configuration. In the operation of the device, staged filtration is achieved with larger contaminants accumulating in the upper filtration layer and smaller contaminants progressively accumulating in the subsequent layers. After backwashing by reverse liquid flow, the layers are reformed substantially in place without substantial intermixing between the layers as a result of the graded granule sizes and specific gravities.

14 Claims, 5 Drawing Figures

DEEP BED FILTER

RELATIONSHIP WITH OTHER APPLICATIONS

The present application is the continuation-in-part of my earlier-filed United States Patent Applications, Ser. No. 801,702, filed May 31, 1977 and 879,296, filed Feb. 21, 1978, both now abandoned.

The specific granules and the method of making them are disclosed in Ser. No. 879,281, filed Feb. 21, 1978, now abandoned, and co-pending Ser. No. 023,369, filed on even date herewith.

BACKGROUND OF THE INVENTION

1. Field of the Invention

The present invention relates generally to a bed for filtering contaminants from liquid and more particularly to a multilayer deep bed filter which includes one or more layers of synthetic, water-wetted, granular filter medium.

2. The Prior Art

As is known to those in the art, sand, anthracite and other materials have been used in mono-media filters for many years with fair results. In more recent years, filtration technology has provided many variations in deep bed filters in an effort to achieve better effluent clarity and longer filtration runs. These more recent filters include plural media layers, such as disclosed in Duff U.S. Pat. No. 3,436,280, Rice U.S. Pat. No. 3,171,801 and Steward U.S. Pat. No. 3,382,983. The first two of these patents disclose the use of anthracite on top of sand and therefore exhibit certain inherent drawbacks, basically because the surface is not porous enough to allow dirt of floc penetration. This is caused by the residual fines on the surface and by the fact that anthracite is comprised of flat or flaky particles which tend to reduce porosity. The third patent is comprised of several layers of relatively heavy filter materials, making it difficult to expand the layers in a backwash cycle for the removal of contaminants and then reform the beds without substantial intermixing.

U.S. Pat. No. 3,343,680 to Rice discloses a deep bed filter using three different medias where the average number of filter particles increases in the direction of filtration flow. This particular arrangement is difficult to achieve, and therefore many in the filtration art have elected to use the simpler dual bed media filters.

In short, filtration technology to date has not provided the art with a multi-layer deep bed filter which includes one or more layers that are comprised of relatively large, substantially uniformly-sized and shaped, water-wettable granules that will leave an exposed porous surface capable of preventing surface loading. Because of this failure or shortcoming in the art, there remain several drawbacks. First, shorter filtration runs have been required because contaminants accumulate at the entrance to the filter bed and "blind-off" the bed. Second, if non-water-wetted materials are used in the top layers, two adverse results may occur: hydrocarbon contaminants may coat the granules, making their rejuvenation difficult; and air bubbles may attach to the granules, altering the overall specific gravity of the granules so that they might flow out of the filter during a backwashing cycle. Third, the overall efficiency of the deep bed filter has not reached its potential due to limitations on the staged filtration concept as a result of the limitations imposed by the practical available filter materials, these limitations including non-uniformly sized granules and limited variations in the density and shape of naturally-occurring water-wettable materials.

SUMMARY OF THE INVENTION

These and other disadvantages and shortcomings in the prior art are overcome in the present invention through the use of one or more layers of synthetic filter material in combination with one or more additional filter media layers, which may be of the same synthetic material or which may include naturally-occurring filter materials such as anthracite and sand.

A filter made in accordance with the present invention preferably includes a plurality of vertically superimposed layers of filter medium granules. At least some of these layers are composed of molded, synthetic, water-wettable granules of generally uniform shape and size throughout a given layer. Preferably, the synthetic granules comprise a plurality of hollow silica beads distributed in a matrix of cured cement. The specific gravity of such granules for use in water filters range from about 1.04 to about 1.5, and the granules may be readily molded to substantially uniform shapes and sizes. The specific gravity of the particles is readily adjustable and controllable as set forth in my above-identified applications. If a liquid other than water is filtered by the use of such particles, the specific gravity is adjusted to be from about 4% to about 50% greater than that of the liquid. These granules constitute at least the uppermost layer of the vertically disposed bed through which the contaminant liquid flows downwardly, and the granules provide an upper surface in which the medium is relatively large, substantially uniformly sized and shaped, and water-wetted, and the exposed surface is porous and capable of preventing surface loading.

A desired, multi-layer deep bed filter may be provided with lower levels of naturally occurring materials, such as anthracite, sand, and/or granulated nut shells or fruit pit shells disposed beneath one or more per layers of those synthetic materials above described. For example, an uppermost layer of synthetic material might have a specific gravity in the range of from about 1.04 to about 1.12. A second layer having a specific gravity in the range of from about 1.2 to about 1.4 may be composed of the same type of synthetic material or may be granulated nut shells or fruit pit shells. A third layer could be comprised of anthracite and the fourth layer could be comprised of sand. Alternatively, a plurality of layers of synthetic materials may be utilized, the layers being composed of granules of progressively increasing density and progressively decreasing size downwardly through the depth of the bed.

Since the specific gravity of the synthetic granules can be controlled with some precision by varying the proportions of its constituents, and since the size and shape of the synthetic granules can be controlled by the mold in which it is formed, it will be readily appreciated that a filter bed of the present invention can be "tailor-made" for almost any filtration task. Further, the precise uniformity of the size and shape of the granules will prevent "reverse stratification" following backwash, there will be no inherent "fines" in any of the layers, and clearly defined, substantially non-mingled boundaries will exist between adjacent layers in the bed, even after repeated backwashing. Where natural materials are utilized in the lower layers, it is preferred that the materials be narrowly graded, with a minimum of fines.

The present invention provides a deep bed filter having several advantages over the prior art. First, staged filtration is achieved whereby the larger contaminants are accumulated in the upper, coarser layers and the finer contaminants are accumulated, for the most part, in the lower finer filter layers. This enables in-depth penetration of the larger contaminants to reduce the occurrence of surface plugging, even where lower layers of natural materials are utilized. Second, the synthetic granules are highly uniform in size and the sizes of the other materials are closely controlled, to reduce reverse stratification. Third, because in-depth penetration and staged filtration are achieved, longer filtration runs may be obtained, thereby minimizing down time for filter backwashing. Fourth, waterwettable granules are provided in at least the upper one or more layers, facilitating the backwashing of hydrocarbon contaminants and minimizing bubble adherence to the filter granules. Fifth, excellent clarity may be achieved with a filter of the present invention. Sixth, a much lower pressure differential will exist between the inlet and discharge ports. This will save considerable energy. Seventh, an important advantage is obtained by the differences in rate of fall of the various materials and the resultant reconstitution of the bed with minimal mixing of the layers following backwash.

These and other advantages and meritorious features of the present invention will be more fully appreciated from the following detailed description and the appended claims.

DETAILED DESCRIPTION OF THE PREFERRED EMBODIMENTS

The present invention relates to a deep bed filter which includes a plurality of essentially distinct layers of filter material. In the invention, at least the upper layer is comprised of water-wetted, uniformly sized and shaped filter granules which have a relatively low specific gravity.

Figure 1:
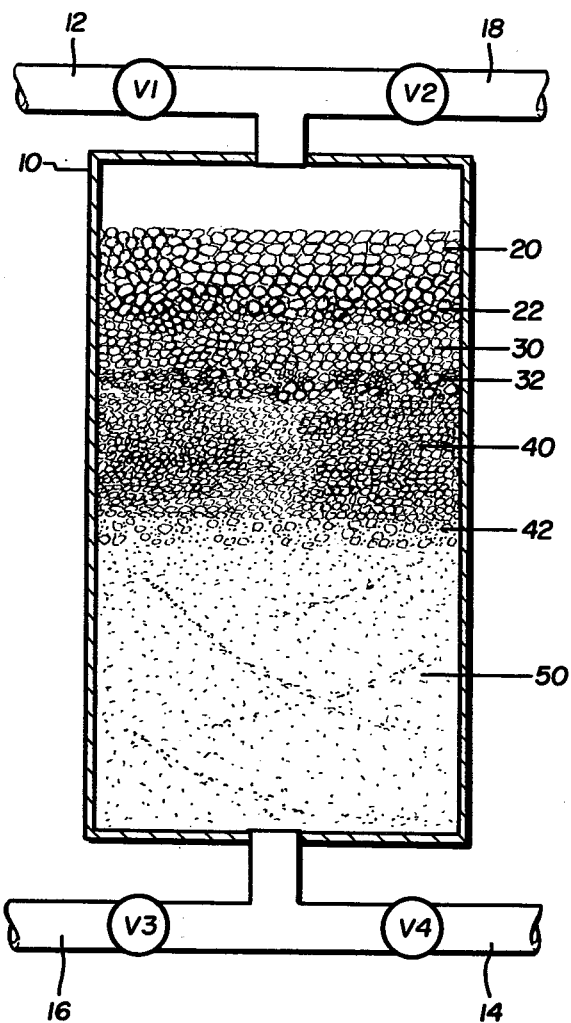
FIG. 1 is a schematic illustration of a deep bed filter of the present invention.

Referring to FIG. 1, a filter housing 10 is illustrated as containing a deep bed filter comprised of four separate layers, 20, 30, 40, and 50. An inlet flow line 12 supplies contaminated liquid to the filter housing 10 for downward filtration flow through the successive layers. Clarified effluent flows out of filter housing 10 through a discharge line 14. An inlet line 16 is provided to supply backwash liquid upwardly through the filter layers, with the backwash liquid being discharged through flow line 18. Valves V1, V2, V3, and V4 are included in respective flow lines 12, 18, 16, and 14 to appropriately control the flow of liquid. For example, valves V1 and V4 are opened and valves V2 and V3 are closed during filtration flow, whereas valves V2 and V3 are opened and valves V1 and V4 are closed during backwashing.

According to the present invention, the filter granules of at least layer 20 are water-wettable, highly uniform in size, on the order of from about 0.10 inch to about 0.25 inch, preferably within the range of from about 0.12 to about 0.16 inch, and have a specific gravity in the range of from about 1.04 to about 1.5, preferably within the range of from about 1.04 to about 1.12.

Substantially uniform filter granules are desired so that the porosity of the entrance surface to the deep bed filter may be maintained essentially the same before and after backwashing. In other words, filter materials which are not highly uniform in size tend to reversely stratify after backwashing so that the finer granules are on top of the coarser granules. Such reverse stratitification is undesirable, particularly in the uppermost layers of the deep bed filter, because contaminants tend to accumulate on the entrance surface, rather than penetrating into the deep bed filter, thereby causing surface plugging. As a result, backwashing is required prematurely. To promote backwash expansion of the bed, the particles may vary slightly in size but within the indicated ranges. The use of multiple sizes, up to six different sizes, reduces the tendency of the particles to cling together and cluster in groups. Even though of slightly different sizes, the particles are far more uniform than are natural materials and the particles may be defined as "substantially uniform."

The granules of optional layer 30 are likewise preferably highly uniform in size and water-wettable. The desired size range for these granules, if synthetic, is from about ⅛ inch to about 3/16 inch in diameter; and the desired specific gravity is in the range of from about 1.2 to about 1.5. In accordance with the invention, the granules of this layer are synthetic and may be formed of the same materials as the granules of layer 20. In use, the granules of layer 30 are more dense and smaller than the granules of the layer 20. As indicated by reference numeral 22, only slight intermixing will occur between layers 20 and 30 after backwashing, depending upon the backwash flow rates and the layers will remain essentially distinct.

Layer 40 and optional layer 50 may be comprised either of naturally-occurring materials or of additional synthetic granules. For example, layer 40 may be comprised of synthetic granules ranging from about 1/16 inch to about ⅛ inch in diameter and having a specific gravity of about 1.3 to about 1.35. The synthetic granules of layer 50 may be of a size on the order of about 1/32 to about 1/14 inch and of a specific gravity of about 1.4 to about 1.5. It should be understood that the granules of layers 20, 30, 40 and 50 are of professively decreasing size and of pregressively increasing density within the broadly defined parameters of 1/16 inch to ⅜ inch in diameter and 1.1 to 1.5 specific gravity. Further, two, three, or four layers or even more may be used. Alternatively, layer 40 may be comprised of either anthracite or sand. Preferably, the anthracite of layer 40 has a specific gravity of about 1.6, and the optional layer 50 is comprised of sand having a specific gravity of about 2.5. As shown by reference numerals 32 and 42, an intermixed interface is established between each adjacent, superimposed layer 40 and 50.

The preferred granular material of the present invention comprises a plurality of hollow, spherical silica beads dispersed in a matrix of cured cement. The beads may be obtained from electrostatic precipitators for coal-fired boilers or may be glass beads or "microballoons." The proportions of beads to cement vary to correspondingly vary the specific gravity of the granules, but each bead in the granule is surrounded by closed voids or cells formed when the cement, in curing, reacts chemically with that film of water inherently present on each bead. Thus, the specific gravity of the composite bead-matrix granule is substantially less than that expected from the proportions of dried bead-to-cement constituents. The proportions of about 50% to about 80% cement and about 5% to about 20% beads in the final granule yields specific gravities ranging from about 1.04 to about 1.5, the specific gravity increasing proportionally with an increase in the amount of cement. This granular material is preferred as a filter medium, because both the cement and the silica beads are water-wettable, and the final granule is hydrophilic. Further, the composition can be readily molded to a desired cylindrical or frustro-conical shape. If the cement-bead composition is air-dried, then it will gain some weight when immersed in water. The composition can either be moist-cured or soaked in water for a period of up to several days, after which no more water is absorbed or taken up by the material.

The method of making the specific granular materials of this type and specific granule structures and compositions are fully disclosed in my above-identified co-pending applications. Reference may be made to these co-pending applications for a full disclosure of the granule composition and the method of making same.

Water-wettability is desired for two primary reasons. Materials which are oleophilic, as opposed to oleophobic or hydrophilic, tend to become coated with hydrocarbon contaminants which are not readily removed during backwashing. Additionally air bubbles tend to attach to the outer surface of non-water-wetted granules during filtration or backwashing, altering the effective gravity of the granules and increasing the chances that the granules will flow out of the filter during a backwash cycle. Therefore, for purposes of the present invention, the terms water-wettable or substantially water-wettable are intended to refer to granules which are hydrophilic, have a weak affinity for hydrocarbons and do not exhibit a strong tendency for bubble attachment.

Preferably, the granules or particles of layer 20 are each of a mean diameter in the size range of from about 0.10 inch to about 0.25 inch. The granules or particles preferably are generally in the shape of a cylinder, i.e., they either may be frusto-conical or cylindrical, and may vary in length from about 0.10 inch to about 0.25 inch. The materials are molded or extruded and chopped and may be tapered for ease of removal from the mold. Alternatively, the materials may be molded in a sheet, which is then fractured and sized to provide granules or particles of the desired size. Since there are no known naturally-occurring filter materials which satisfy this size range along with the desired specific gravity, water-wettability characteristic and uniformity in size and shape, the present invention proposes the use of a synthetic filter granule.

Figure 2:
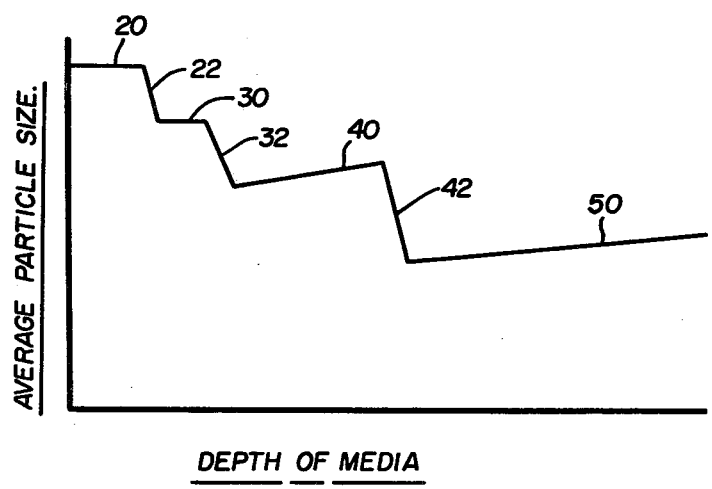
FIG. 2 is a schematic graph, illustrating the average particle size in the direction of filtration flow through a deep bed filter of the present invention.

Naturally-occurring materials such as anthracite and sand are comprised of non-uniform granules which tend to reversely stratify after backwashing so that the finer particles are near the top of each respective layer. This is illustrated in FIG. 2, where the average particle sizes through layers 20, 30, 40 and 50 and through interfaces 22, 32, and 42 are plotted against depth of media. This figure illustrates that the average particle size through the depth of layer 20 remains essentially constant until interface 22 is reached. At that point, the average particle size decreases to the size of the granules in layer 30, where the average particle size likewise remains constant. Therefore, the average number of particles per unit area in the direction of flow through each respective layer 20 and 30 remains essentially constant. At interface 32, the average particle size again sharply decreases as likewise occurs in interface region 42. The slightly inclined lines of FIG. 2 corresponding to layers 40 and 50 indicate that the finer particles are near the tops of those respective layers as a result of reverse stratification during backwashing. Therefore, the average number of particles per unit area in the direction of flow through layers 40 and 50 gradually decreases.

The depths of each filter layer may be chosen as desired. One example is for layers 20 and 30 to be about three inches in depth, layer 40 to be about 6 inches, and layer 50 about 12 inches. The depth of the various interface layers will depend upon the backwash flow rate. With a backwash flow rate of about fifteen to twenty gallons per minute per square foot of filter bed cross-section (GPM/ft$^2$), interfaces 22, 32, and 42 may have respective depths of about one-half inch, one inch, and one inch. With backwash rates below 12 GPM/ft$^2$, very little mixing would take place at the various interfaces.

Accordingly, in the operation of the present invention, contaminated liquid is introduced into filter housing 10 by way of inlet line 12 so that filtration occurs downwardly through the successive, essentially distinct granular medium layers. After the filter has accumulated a substantial quantity of contaminants filtration flow is terminated by closing valves V1 and V4 and opening valves V2 and V3 to initiate a back-washing cycle. During backwashing, liquid flows upwardly through the layers at a sufficient rate to expand the layers substantially in situ and remove the accumulated contaminants. When the filter layers have been rejuvenated sufficiently, backwash flow is terminated and the layers are reformed essentially in accordance with FIG. 2 for a subsequent filtration cycle.

Figure 3:
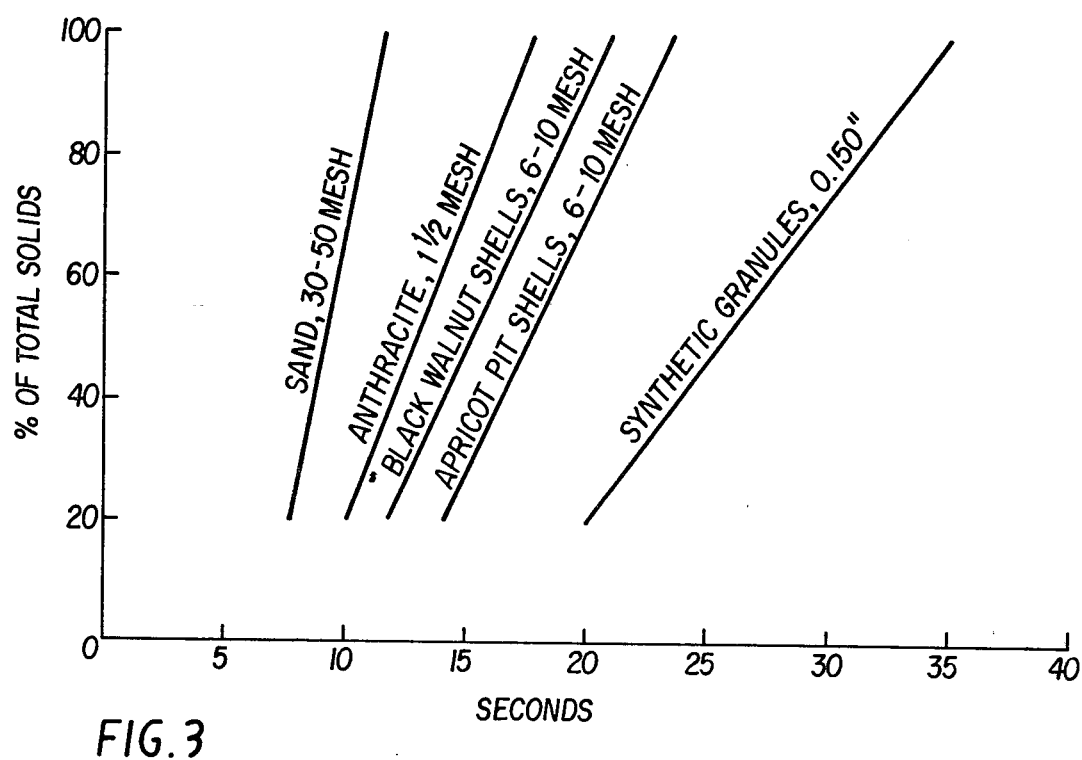
FIG. 3 is a graph illustrating the comparative rates of fall of various filter media.

FIG. 3 is a graph comparing the rate of fall of various filter media. The media were individually placed in a glass tube containing water and the media-water mixture was agitated to fully suspend the media in the water. The time interval, recorded horizontally in the graph, is the time in seconds for the media to travel 54 inches vertically in the water confined in the tube. The vertical scale is the percentage of total solids falling the distance of 54 inches in the indicated time period.

From the graph, it will be seen that the sand having an estimated particle size of 0.018 inches falls the 54 inches within a total time span of about 12 seconds, with 60% of the sand having fallen within 10 seconds. One and one-half mesh anthracite having an estimated particle size of 0.035 inches falls through the 54 inches in less than 18 seconds, with 60% of the anthracite falling in about 14 seconds. Six to ten mesh black walnut shells falls the 54 inches within about 22 seconds, with 60% falling within 17 seconds. Six to ten mesh apricot pit shells falls within 24 seconds, with 60% falling within 19 seconds. Synthetic cement-silica granules, as hereinbefore described, fall the 54 inches within 35 seconds, with 60% of the granules falling within about 27 seconds.

Figure 4:
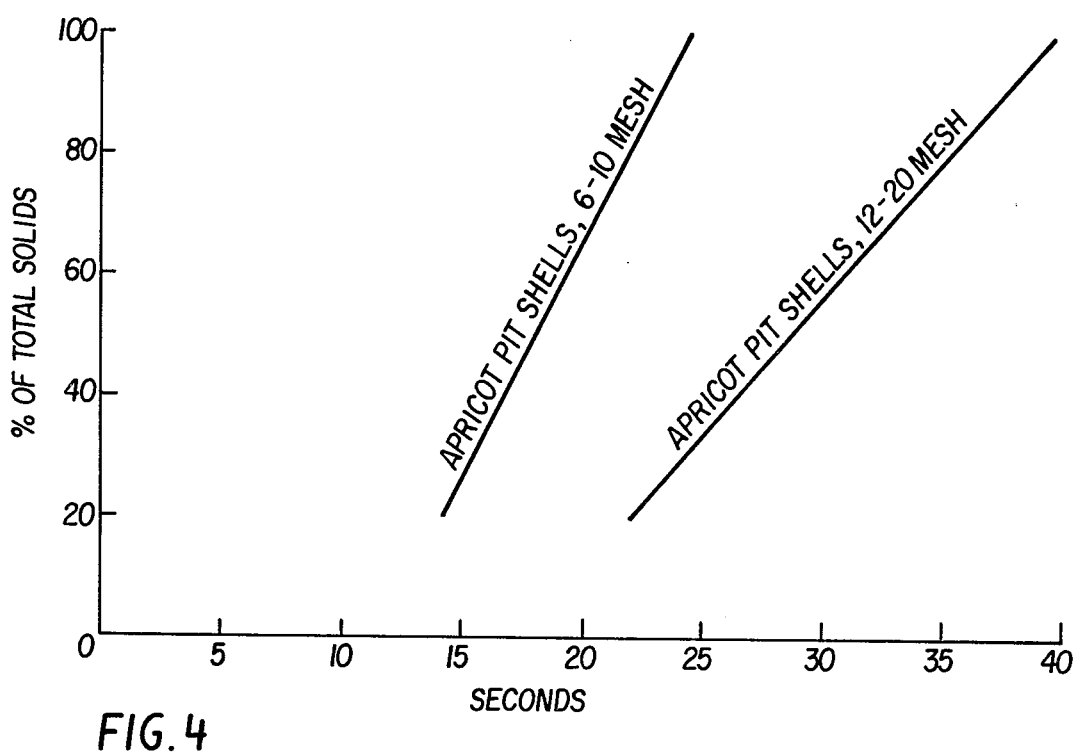
FIG. 4 is a graph illustrating the effect of size on the rate of fall.

FIG. 4 is similar to FIG. 3, but it illustrates the effect of particle size on the rate of fall in water. While 6 to 10 mesh apricot shells all fell within 24 seconds, about 41 seconds were required for the complete fall of 12 to 20 mesh apricot pit shells. Sixty percent of the six to ten mesh material fell within 19 seconds, while about 31 seconds were required for the fall of 60% of the 12 to 20 mesh material.

From the graphs of FIGS. 3 and 4, it will be seen that specific combinations of media of predetermined density and of predetermined particle size can be incorporated into a multiple layer bed which will reclassify itself following backwash, because of the appreciable differences in fall rate of the chosen materials. The classification of the materials by rate of fall, as shown in FIG. 4, is quite clear-cut, and the classification characteristics will be readily observed.

Figure 5:
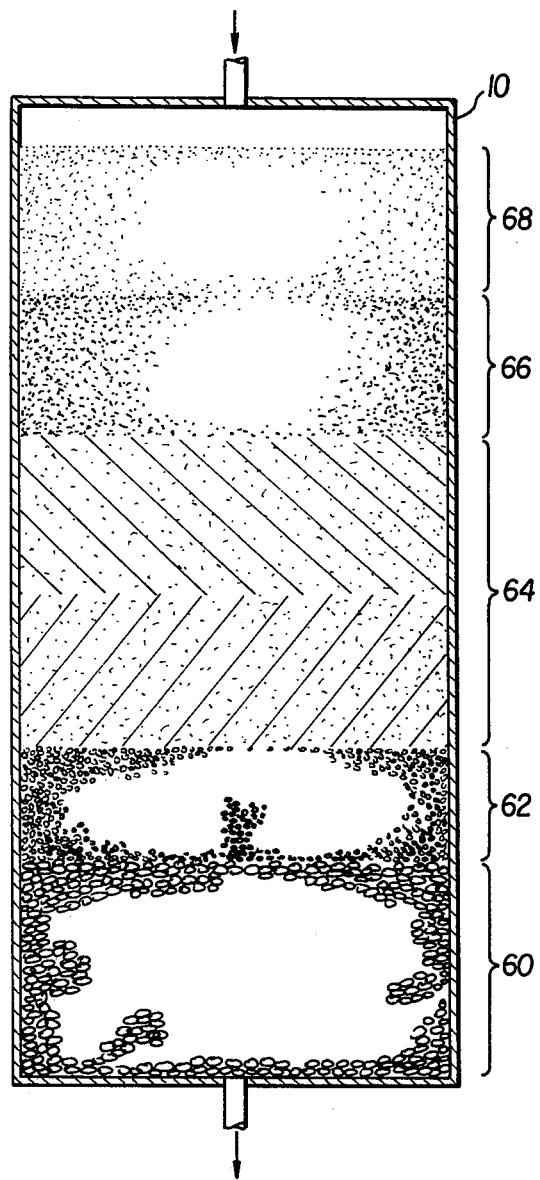
FIG. 5 is a view similar to FIG. 1 illustrating the presently preferred best mode of the present invention.

Utilizing the data from FIGS. 3 and 4, the presently known best mode of carrying out the present invention has been derived and is illustrated in FIG. 5 of the drawings.

In FIG. 5, the receptacle 10 is the same as the receptacle 10 of FIG. 1 and is connected to the same inlet and outlet lines and valves as incorporated in FIG. 1. The multiple layer bed of FIG. 5 includes a gravel underdrain 60 which serves to support the remainder of the bed, as is conventional in deep bed filters. Superimposed on the gravel underdrain is a layer 62 of filter sand. The sand of the bed 62 has a specific gravity on the order of from about 2.60 to about 2.65, and the sand is of an estimated particle size on the order of about 0.018 inch.

Superimposed on the sand layer 62 is a layer 64 of anthracite, preferably of a particle size on the order of about 0.035 inches. The anthracite has a specific gravity on the order of from about 1.55 to about 1.65.

Next, a layer 66 of nut shells or fruit pit shells is superimposed on the anthracite layer 64. The granules or particles of the layer 66 have a specific gravity on the order of from about 1.30 to about 1.35 and preferably are of a size on the order of from about six to about ten mesh, which corresponds to an estimated average particle size on the order of about 0.10 inch. Suitable shells for incorporation into the layer 66 include black walnut shells, English walnut shells, pecan shells, apricot pit shells, peach pit shells, and the like materials.

The uppermost layer 68 is composed of granules or particles each comprising hollow silica beads dispersed in a cured cement matrix as hereinbefore described. As used in this specific deep bed filter, the particles of the layer 68 have a specific gravity on the order of from about 1.05 to about 1.10 and have an estimated particle size on the order of 0.140 inch. As will be apparent from the data presented in FIGS. 3 and 4, the comparative fall rates of the particular materials incorporated in the layer 62, 64, 66, and 69 are such that the bed will easily and quickly reclassify itself into the specific layers following backwash and an effective, multiple layer deep bed filter will be provided.

The layers may be of varying depth, depending upon the materials being filtered. Typically, bed 62 may be 12 inches deep, bed 64 may be 9 inches in depth, bed 66 may be 6 inches deep and bed 68 may be 3 inches deep.

The specific gravity of the synthetic cement-silica granules or particles can, as hereinbefore disclosed, range from about 1.04 to about 1.5. The specific gravity of a specific particle of this character will depend upon the specific gravity of the next underlying layer in the filter bed. For example, where the next underlying layer is anthracite having a specific gravity ranging from 1.55 to 1.65, the cement-silica particles may have a specific gravity of up to 1.5. On the other hand, where the next underlying layer is composed of particles of nut shells or fruit pit shells having a specific gravity ranging from about 1.30 to about 1.35, the maximum desirable specific gravity of the cement-silica granules would be about 1.26. The minimum specific gravity of the cement-silica particles, for use in water, is about 1.04. Thus, the adjustability of the specific gravity of the synthetic particles by varying the proportions of silica beads and cement gives great flexibility to the utilization of the particles in conjunction with other filter media and in the filtration of liquids other than water. In summary, the minimum specific gravity of the particles is about 0.04 greater than the specific gravity of the liquid being filtered, and the maximum specific gravity of the particles is about 0.04 less than the specific gravity of the next adjacent lower layer in the filter-bed, up to a maximum specific gravity of about 1.5.

The foregoing description is intended as exemplary, rather than limiting in any sense. For example, materials other than those specifically disclosed may be used to achieve the overall desired parameters. Additionally, the specific gravity of the materials in the uppermost layers may be selected as desired, based upon the specific materials used in the lowermost layers. The specific gravity of each material is based upon its use in filtering water-based liquids. In the event other liquids are to be filtered, the specific gravity of the various layers will be adjusted accordingly. For example, the specific gravity of the uppermost layer may be adjusted to be 1.04 to 1.5 times the specific gravity of the liquid being filtered.

Having completely and fully disclosed my invention, I now claim:

1. A deep bed filter, which classifies after backwashing from coarse to fine in the direction of filtration flow, comprising a plurality of vertically superimposed, essentially distinct layers of filter medium granules, wherein the granules in each layer are water-wettable, are substantially uniform in size, are smaller than the granules in the layer thereabove, have a specific gravity ranging from about 1.04 to about 1.5, are of a specific gravity greater than the granules in the layer thereabove, and classify after backwashing from coarse to fine in the direction of filtration flow, each granule in each layer comprising hollow silica beads dispersed in a matrix of cured cement.

2. A deep bed filter, comprising two vertically superimposed, essentially distinct, adjacent layers of filter medium granules, wherein the granules in the lower layer are not highly uniform in size, are naturally occurring materials, are finer than the granules in the layer thereabove and have a specific gravity of greater than about 1.3, the granules in the upper layer having a specific gravity in the range of from about 1.04 to about 0.04 less than the specific gravity of said lower layer and comprising hollow silica beads dispersed in a matrix of cured cement.

3. A deep bed filter, comprising a plurality of distinct layers, each layer consisting essentially of synthetic, water-wettable, filter medium particles and means for flowing contaminated liquid through said layers in succession, the particles of the successive layers increasing in density and decreasing in size in the direction of liquid flow therethrough, and each of said particles comprising hollow silica beads dispersed in a matrix of cured cement.

4. In a deep bed filter wherein a plurality of superimposed layers of filter medium particles are utilized to remove contaminants from liquid flowing downwardly through said layers, the improvement of an uppermost water-wettable surface layer consisting essentially of a plurality of filter particles each comprising hollow silica beads dispersed in a cured cement matrix and having a specific gravity ranging from about 1.04 to about 1.5, the particles being of substantially uniform size and shape to provide a water-wettable surface of sufficient porosity to be resistant to surface loading.

5. In a deep bed filter comprising a bottom, essentially distinct layer of sand, and an intermediate layer of anthracite superimposed over the sand and intermixed therewith along an interface region, the improvement of an essentially distinct, upper layer of filter media particles, the filter media of the upper layer being coarser than the anthracite and the sand; the media particles of the upper layer each comprising hollow silica spheres dispersed in a matrix of cured cement, the particles of said upper layer being substantially uniform in size and having an overall specific gravity ranging from about 1.04 to about 1.5.

6. In a deep bed filter as defined in claim 5, the further improvement of interposing a layer of particles selected from the group consisting of nut shells and fruit pit shells between the anthracite layer and the upper layer, the interposed layer having a specific gravity on the order of about 1.3 to 1.35 and the upper layer having a specific gravity of less than 1.26.

7. A deep bed filter comprising a top layer of filter granules comprising hollow silica beads dispersed in a matrix of cured cement, and a lower layer of naturally occurring filter material having a specific gravity of at least about 1.3, the granules of said top layer having a specific gravity ranging from about 0.04 greater than that of the liquid being filtered to about 0.04 less than that of the granules of the lower level, up to a maximum of about 1.5.

8. A deep bed filter comprising a top layer of filter particles each comprising hollow essentially spherical, silica beads dispersed in a matrix of cured cement, and at least one lower layer of naturally occurring particulate filter material have a specific gravity of at least 1.3 and greater than that of said top layer.

9. A deep bed filter, which classifies after backwashing from coarse to fine in the direction of filtration flow, comprising, in descending order,
  (a) a top layer of particles each comprising hollow silica spheres dispersed in a matrix of cured cement;
  (b) a second layer of granulated nut shells or fruit pit shells;
  (c) a third layer of anthracite; and
  (d) a fourth layer of sand.

10. A deep bed filter as defined in claim 9, wherein the specific gravity of the layers, in descending order, increases and the particle size of the particles in each layer, in descending order, decreases.

11. A deep bed filter as defined in claim 9, wherein
  (1) the particles in layer (a) have a specific gravity on the order of about 1.05 to about 1.12 and a particle size on the order of 0.140 inch;
  (2) the particles in layer (b) have a specific gravity on the order of about 1.30 to about 1.35 and a particle size on the order of 0.10 inch;
  (3) the particles in layer (c) have a specific gravity on the order of about 1.55 to about 1.65 and a particle size on the order of 0.035 inch;
  (4) the particles in layer (d) have a specific gravity on the order of about 2.60 to about 2.65 and a particle size on the order of 0.018 inch.

12. In a deep bed filter, which classifies after backwashing from coarse to fine in the direction of filtration flow, wherein a plurality of superimposed layers of filter medium particles are utilized to remove contaminants from liquid flowing downwardly through said layers, the improvement of an uppermost water-wettable surface layer of filter particles each comprising hollow silica beads dispersed in a cured cement matrix and having a specific gravity less than that of the media constituting the other layers to provide a water-wettable surface of sufficient porosity to be resistant to surface loading, the particles of the uppermost layer being coarser than the media of any of the underlying layers.

13. In a deep bed filter, which classifies after backwashing from coarse to fine in the direction of filtration flow, comprising a bottom layer of sand, an intermediate layer of anthracite superimposed on the sand, and a layer of nut shells or fruit pit shells superimposed on the anthracite, the improvement of at least one essentially distinct, upper layer of filter media particles superimposed on the shell layer, the filter media of the upper layer being coarser and lighter than the media of any of the underlying layers; the media particles of the upper layer each comprising hollow silica spheres dispersed in a matrix of cured cement.

14. A deep bed filter, which classifies after backwashing from coarse to fine in the direction of filtration flow, in which the bed comprises a bottom, essentially distinct layer of sand, a layer of anthracite superimposed on the sand, a layer of nut shells or fruit pit shells superimposed on said anthracite layer, and an uppermost layer of filter media particles superimposed on the shell layer, the media particles of the uppermost layer each comprising hollow silica spheres dispersed in a matrix of cured cement and the media of the separate layers being of progressively increasing specific gravity and of progressively decreasing size vertically downwardly of the bed.

* * * * *